(12) United States Patent
Bartilson (10) Patent No.: US 7,808,214 B2
(45) Date of Patent: Oct. 5, 2010

(54) SHORT-CYCLING SERIAL HYBRID DRIVETRAIN WITH HIGH POWER DENSITY STORAGE

(76) Inventor: Bradley Wayne Bartilson, 10 River Run Hollow Rd., Columbia, NJ (US) 07832

( * ) Notice: Subject to any disclaimer, the term of this patent is extended or adjusted under 35 U.S.C. 154(b) by 312 days.

(21) Appl. No.: 11/686,314

(22) Filed: Mar. 14, 2007

(65) Prior Publication Data

US 2008/0142282 A1    Jun. 19, 2008

Related U.S. Application Data (63) Continuation-in-part of application No. 11/613,014, filed on Dec. 19, 2006.

(51) Int. Cl.
*H02J 7/00* (2006.01)
*B60L 1/00* (2006.01)
*B60K 6/00* (2007.10)

(52) U.S. Cl. .................. 320/167; 320/104; 180/65.2; 307/10.1; 903/905

(58) Field of Classification Search .............. 363/59, 363/97, 106; 323/281, 282, 283, 284, 285, 323/901; 320/150, 166, 167; 318/86, 87, 318/88, 152, 376, 717, 800; 307/9.1, 10.1; 180/65.2, 65.1, 65.3; 903/905
See application file for complete search history.

(56) References Cited

U.S. PATENT DOCUMENTS

| | | | |
|---|---|---|---|
| 3,061,031 A | 10/1962 | Packard | |
| 3,899,359 A | 8/1975 | Stachurski | |
| 4,045,075 A | 8/1977 | Pulver | |
| 4,087,106 A | 5/1978 | Winchell | |
| 4,148,192 A | 4/1979 | Cummings | |
| 4,215,553 A | 8/1980 | Poirier et al. | |
| 4,489,242 A | 12/1984 | Worst | |
| 4,715,192 A | 12/1987 | Katz | |
| 4,732,819 A | 3/1988 | Komuro | |
| 4,752,697 A | 6/1988 | Lyons et al. | |
| 4,910,414 A | 3/1990 | Krebs | |
| 5,116,069 A | 5/1992 | Miller | |
| 5,401,056 A | 3/1995 | Eastman | |
| 5,495,905 A | 3/1996 | Fini, Jr. | |
| 5,729,463 A | 3/1998 | Koenig et al. | |
| 5,857,336 A | 1/1999 | Paul et al. | |
| 5,910,722 A | 6/1999 | Lyons et al. | |
| 5,934,395 A * | 8/1999 | Koide et al. ............ | 180/65.235 |
| 5,998,885 A * | 12/1999 | Tamor et al. ............... | 307/10.1 |
| 6,118,237 A * | 9/2000 | Kikuchi et al. .............. | 318/139 |

(Continued)

OTHER PUBLICATIONS

WO2005078892,Jones et al.,Power Supply Sytem for Electrical Devices, entire document.*

*Primary Examiner*—Edward Tso
*Assistant Examiner*—M'Baye Diao
(74) *Attorney, Agent, or Firm*—Woodcock Washburn LLP (57) ABSTRACT

A serial hybrid drivetrain enables "super-efficiency" (fuel efficiency exceeding 100 miles-per-gallon) in a lightweight transportation vehicle, utilizing only high power density storage media (for example ultracapacitor media), with the total energy of storage constrained to minimize storage mass, and the resulting low energy requiring a short-cycle of charge and discharge. A unique control system design enables a high extraction of the total energy from the medium, as well as full-rate recovery of regenerative braking energy.

11 Claims, 10 Drawing Sheets

U.S. PATENT DOCUMENTS

| | | |
|---|---|---|
| 6,265,851 B1 | 7/2001 | Brien et al. |
| 6,394,209 B1 * | 5/2002 | Goehring et al. ........ 180/65.245 |
| 6,437,544 B1 | 8/2002 | Yang |
| 6,449,554 B2 | 9/2002 | Yamawaki |
| 6,464,026 B1 | 10/2002 | Horsley et al. |
| 6,605,773 B2 | 8/2003 | Kok et al. |
| 6,651,433 B1 | 11/2003 | George, Jr. |
| 6,724,100 B1 * | 4/2004 | Gabriel ........................ 307/9.1 |
| 6,876,098 B1 | 4/2005 | Gray, Jr. |
| 6,994,360 B2 * | 2/2006 | Kuang et al. ........... 180/65.235 |
| 7,004,273 B1 | 2/2006 | Gruenwald et al. |
| 7,068,017 B2 | 6/2006 | Willner et al. |
| 7,078,877 B2 | 7/2006 | Salasoo et al. |
| 7,086,017 B1 | 8/2006 | Bloom |
| 7,100,369 B2 | 9/2006 | Yamaguchi et al. |
| 7,104,060 B2 | 9/2006 | Ogawa et al. |
| 7,109,408 B2 | 9/2006 | Kucherov et al. |
| 7,109,686 B2 | 9/2006 | Schulte et al. |
| 7,111,465 B2 | 9/2006 | Bell |
| 7,138,730 B2 | 11/2006 | Lai |
| 7,248,030 B2 | 7/2007 | Yoshino |
| 7,370,480 B1 | 5/2008 | Balzano |
| 7,642,755 B2 | 1/2010 | Bartilson et al. |
| 2003/0042866 A1 * | 3/2003 | Minamiura et al. ......... 320/104 |
| 2004/0100149 A1 | 5/2004 | Lai |
| 2005/0074645 A1 | 4/2005 | Fattic |
| 2005/0204733 A1 | 9/2005 | Sasaki |
| 2005/0204762 A1 | 9/2005 | Sasaki |
| 2006/0000651 A1 | 1/2006 | Stabler |
| 2006/0237242 A1 | 10/2006 | Burke |
| 2007/0181355 A1 * | 8/2007 | Harris ........................ 180/65.2 |
| 2008/0223632 A1 | 9/2008 | Bartilson et al. |
| 2008/0223637 A1 | 9/2008 | Bartilson et al. |

* cited by examiner

SHORT-CYCLING SERIAL HYBRID DRIVETRAIN WITH HIGH POWER DENSITY STORAGE

CROSS-REFERENCE TO RELATED APPLICATIONS

This application is a continuation-in-part of U.S. patent application Ser. No. 11/613,014, filed Dec. 19, 2006.

DESCRIPTION

1. Field of the Invention

The present invention relates to a serial hybrid drivetrain system with a high power density energy storage medium for achieving "super-efficiency", i.e., exceeding 100 miles-per-gallon, in a personal transportation vehicle.

2. Background of the Invention

In hybrid drive system for transportation vehicles, an internal combustion engine (ICE), works in concert with an electric drive system to provide torque that generates wheel rotation. Incurring additional components and complexity, these systems provide improved efficiency through timely storage and release of energy via an energy storage system (ESS), and complementary (on/off) cycling of the ICE. There are two basic approaches to hybrid drives-parallel and serial.

The parallel approach has been the most commonly used strategy. In this approach the mechanical drivetrain of a conventional system is simply aided by an electric drive and storage system. Such systems allow operation of the ICE at higher efficiency points, as well as return of braking energy ("regenerative braking") to the ESS. The added weight of electrical drive and storage reduces the overall efficiency gain, and the added cost of a parallel drive combine to effect long payback periods. The ability to apply direct shaft power from the ICE to the wheels offers some efficiency advantage over the serial approach. U.S. Pat. No. 6,464,026 describes such a parallel hybrid drivetrain with an advanced control system.

In the serial hybrid drive systems, the ICE is directly connected to a generator. The generator provides electrical power to a motor(s) which drive the wheels. The transmission, mechanical de-coupling mechanism and driveshafts can be eliminated in this approach, as power is transferred by electrical cables (not all serial hybrid drivetrains take advantage of the opportunity). Elimination of these mechanical components requires that the motors and electrical drives must be capable of providing large values of torque across a wide rpm range. The reduced mass of the system does assist in reducing the torque requirements. The serial approach incurs an additional transfer cost, as it requires all ICE power to be transferred into electricity and then back to mechanical power. Recent advances in electrical motors and generators (>95% efficiency) mitigate this impact on overall system efficiency.

U.S. Pat. No. 6,876,098 describes a method of operating a serial hybrid system to specifically overcome the difficulties manifested by storage systems and controls which heretofore have resulted in depletion of the storage system. This condition resulted in complete vehicle stoppage, as the primary mover capacity was design-limited by the charge rate of the storage system (batteries noted as having severe charge rate limitations). The patent addresses the limitation through the use of multiple sources and control of the ICE-generator to avert the reduction of stored energy beneath a threshold value, e.g. 60% of storage capacity. Similarly, U.S. Pat. No. 6,394,209 describes a serial hybrid drivetrain operating at multiple high efficiency points, "smoothed" by the load presented to the electric motor. Other work identifies operation of the ICE across a range of peak efficiency and lowest exhaust emissions as determined by a characteristic curve of ICE measured performance.

Limitations of battery systems in hybrid vehicle applications are expanded upon by U.S. Pat. No. 5,910,722 wherein control of friction brakes is used to accommodate the difference in regenerative braking energy available and the slow charge nature of batteries. U.S. Pat. No. 7,078,877 describes the difficulties in determining the state-of-charge of batteries and includes the use of a braking resistor to dissipate (waste) braking energy.

Batteries, the current energy storage medium, have severely limited hybrid vehicle efficiency through charge/discharge rate limitations, high mass, and charge/discharge inefficiencies. Advanced chemical batteries provide significant improvement in energy per unit mass over conventional lead-acid in power (NiMH, Li-Ion: 200-400 W/kg) and energy per unit mass (200 W-hrkg), yet still impart significant weight contribution when configured for the demands of the current high mass automobile platform. Batteries typically have a limited range of depth-of-discharge. Batteries waste energy through lower charge/discharge efficiency (approximately 75% for lead acid. Li-Ion can be 90% through mid-range, but less than 60% during the last 10% of charging), experience degraded performance at lower temperatures, lose charge during periods of non-use, and have limited charge rates. Supplying the ideal charge rate characteristics for the battery system is not aligned with the rate and duration of the ideal engine/generator operation in a serial hybrid drivetrain, thus creating inefficient use of system available energy. For example, regenerative braking energy is often available at a larger rate than can be absorbed by a battery-based ESS and thus the energy is wasted. This could be accommodated by greatly increasing the battery storage system size; however, this returns us to the inefficiency of carrying large system mass. Additionally, batteries have a limited service life, typically less than half of the life of the vehicle. Accommodating battery inefficiencies and operational limitations by increasing storage capacity results in a higher mass, higher cost and lower vehicle fuel efficiency.

Ultra- or Super-Capacitors (UCs) have been shown by others, to address high current demands (>1000 Amps) and exhibit high charge and discharge efficiency (~98%). However, they have a low energy density (6 Whkg vs. 100 Whkg for Li-Ion batteries), thus not well suited as the sole storage medium for the current, heavyweight automobile platform. UCs has been used in series and parallel circuit combinations with batteries. In series combination, the total energy of the UC can be utilized, supplying the higher end of the voltage range. In this configuration, all current passing through the UC must also pass through the battery, thus limiting charge rate and efficiency of the system. Conversely, when an UC is used in a parallel circuit arrangement with the battery, the UC can receive and discharge at desired high rates, however, the voltage must be allowed to change much more than the battery will allow, thus reducing the capability of the system. Further, the battery limits the extent of energy that can be withdrawn from the UC, as the SOC limit of the battery (typically 25% to avert damage) is much higher than the UC (0%) The unique and non-linear charge requirements of batteries impose limitations on battery-UC combinations in system operation and ultimate system efficiency. Combining the two storage technologies results in more complex, and inherently higher cost hybrid drive systems.

Others have identified approaches with switched banks of UC's, or with a combination of batteries, to avert the extreme voltage reduction that would be experienced by continuing to draw from a single bank, UC-only storage solution. However, this methodology results in significant underutilization of the capability of the UC (typical motor and controller input voltage requirements and associated current limits, restrict storage voltage variation to 20%) and therefore the additions of banks (either battery or UC) bringing additional switching components/complexity, weight (reducing vehicle efficiency) and cost.

U.S. Pat. No. 6,265,851 describes an electric vehicle power system for a semiconductor wafer handling application, having ultracapacitors and batteries as parallel sources connected to a source-selecting switch and having said switch direct its output only to a DC-DC converter which serves the motor load, however, this incurs the converter losses when no conversion is necessary.

Laid open US Pat App. US 2004/0100149 describes topologies for multiple energy sources, including UCs, and accommodates reverse power flow from the utility being driven (case of regenerative braking for a transportation vehicle). In the described topologies, all power is continuously directed through a power converter module, with inherent losses and limitations per device sizing.

U.S. Pat. No. 7,004,273 discusses a bank of ultracapacitors directly bussed to an engine-driven generator with a control management unit bringing the engine on and off to maintain the state-of-charge of the ultracapacitors. This approach does not address the inefficient ultracapacitor capacity utilization issue, resulting in extensive burden/cycling of the engine and/or significant oversizing of the ultracapacitor bank.

U.S. Pat. No. 7,109,686 describes the use of braking resistor and switch structure to assist in charging and discharging an ultracapacitor bank and to protect the ultracapacitor from excessive pre-charge current. A DCDC converter is referenced as expensive, and its use is referenced only as an alternative method to pre-charge the ultracapacitor bank. While low in cost the use of the braking resistor diverts energy, thereby wasting said energy.

Current motor vehicles are far from achieving other than minor gains in fuel economy—a 1982 Honda Civic yielded 38 mpg versus a 2007 Toyota Prius with full hybrid technology achieving an actual 42 mpg. This suggests that the pursuit of "super efficiency" (e.g. exceeding 100 miles per gallon) requires a more radical departure from current vehicle and drivetrain designs. Due to battery limitations, and the inability to fully extract the opportunity from UC and battery/UC combinations, hybrid drivetrains have carried large amounts of stored energy and mass, resulting in long cycle times (charge and recharge cycles) and wasted mass-carrying energy. The recent addition of "plug-in" option or requirement similarly leads to long charge and discharge cycles with similarly large mass-carrying inefficiency, as well as operation complications (power outages, forgetting to recharge, etc.). Additionally, mass exodus onto electrical grid would require large infrastructure investments, which can be avoided by simply capturing the available advantage of large-scale efficiency improvement in direct fossil-fuel powered vehicles.

SUMMARY OF THE INVENTION

The present invention addresses the primary factors identified in the background art which limit the fuel efficiency of hybrid vehicle. More specifically, the apparatus and method of this invention constitute significant advancements over the background art, as evidenced by the following objects.

An object of the invention is to provide a hybrid drive system of such low-mass and high efficiency as to enable a lightweight vehicle (<1500 lbs (680 kg)) to achieve marked improvement in fuel efficiency, i.e. "super efficiency", exceeding 100 miles-per-gallon.

A further object of the invention is to increase the efficiency of a serial hybrid drivetrain by utilizing energy storage medium which can accept high rates of charge transfer from regenerative braking without incurring significant storage medium weight.

A further object of the invention is to maintain high efficiency of charge transfer (>95%) across a wide-range of storage system state-of-charge.

A further object of the invention is achieving high fuel efficiency of a lightweight vehicle by reduction of the stored energy requirements through operation of the ICE of the hybrid drivetrain in shorter cycles.

A further object of the invention is to achieve high fuel efficiency by operating the ICE only one peak efficiency point (single rpm).

Another object is to reduce energy losses by matching the ICE operational cycle (on/off) with the characteristics of a high charge/discharge rate ESS system.

Another object is to enable the full use of the energy within a UC-based ESS.

Another object is to obtain high efficiency in energy transfer to and from the ESS and in storage within the ESS while the ICE is operated at its highest efficiency point.

A further object is to enable the advantages of the above objects, while maintaining a market-attractive vehicle acceleration capability.

A further object is to provide a return-on-investment (or payback) for the addition of a hybrid drivetrain, through reduced components, complexity and required size of hybrid drivetrain, accompanied by high efficiency.

In brief summary, the foregoing objects are achieved by an apparatus which comprises a serial hybrid drivetrain utilizing UCs as it sole energy storage medium (other than the potential energy of the vehicle and commonly rotating masses) with a control circuit extending the useful range of the stored energy, with such apparatus applied to a lightweight vehicle having a total weight of less than 1500 pounds (680 kg).

Additional objects and advantages of the invention are advanced by the following description and may also be learned from the practice of the invention.

BRIEF DESCRIPTION OF THE DRAWINGS

The appended drawings depict specific embodiments of the described invention as to render understanding of the invention; however, they are not to be considered limiting of the scope of the invention. The drawings illustrate only typical, and presently understood, best use mode of the invention.

DETAILED DESCRIPTION OF THE INVENTION

In that current hybrid vehicles have failed to make appreciable progress in fuel economy, the significance of mass upon vehicle fuel efficiency appears to have not been duly regarded. Seen in an interactive relationship, a larger assumed vehicle mass requires a larger, heavier and less fuel-efficient propulsion system, further encumbering the vehicle mass. Furthermore, the potential efficiency improvement of new technologies can be mitigated by a heavy, inefficient platform. Conversely, new technology advancements should be evaluated on their mass-added basis in order to determine overall effectiveness.

The present invention, in components, configuration and methodology, recognizes and captures unique advantage of technologies by understanding the limits imposed by vehicle mass, as well as securing unforeseen opportunities revealed by proper mass regard in hybrid drivetrain invention.

The strong relationship between vehicle mass and fuel economy is well established by the underlying physics of motion and field data. The following power consumption equation expresses this relationship, with mass driving three significant terms:

$$P_{load} = P_{inertia} + P_{tires} + P_{grade} + P_{drag} + P_{acc}$$

Where, $$P_{inertia} = 0.5 \, M \, [\Delta v^2 / \Delta t]$$

$$P_{tires} = C_r M \, gv \text{ (also stated as the tire rolling friction)}$$

$$P_{grade} = M \, gv \sin(\theta) \text{ ($\theta$ is the grade angle)}$$

$$P_{drag} = 0.5 \rho C_b A V 3 / 1000$$

$$P_{acc} = P_{alternator} + P_{air\ conditioning}$$

Data from the U.S. EPA finds strong correlation of observed fuel economy to vehicle mass (approximately 1 gallon per 100 mi per 900 pounds of vehicle weight).

The serial hybrid approach is the likely candidate to align with the lightweight objective (eliminates the mechanical transmission and decoupling mechanism), however, the limitations in the referenced prior art have not achieved market improvement. More directly, they employed a larger ICE and multiple, secondary sources as improvements to avert complete depletion of energy reserves.

Figure 8:
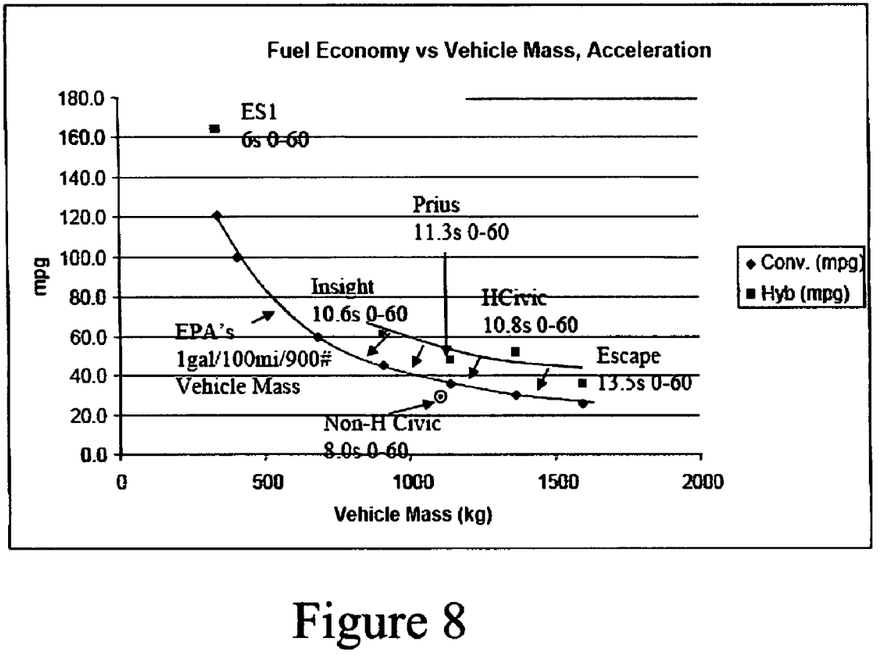
FIG. 8 displays the influence of vehicle mass upon fuel efficiency, the fuel efficiency and acceleration "sacrifice" of current hybrids, and the fuel efficiency and acceleration of the present invention.

The novel hybrid design of the present invention is arrived at by first identifying a vehicle of such mass as to enable the described components, configuration and operational algorithm to achieve desired performance, determining this to be a vehicle of less than 1500 pounds (681 kg). The significance of this determination is described in FIGS. 8, 9, and 10. In FIG. 8, real mass, acceleration and fuel economy data from current hybrid vehicles is compared against the EPA's 1 gallon per 900 pounds of vehicle weight finding. Several observances are warranted from FIG. 8: vehicle mass should be less than 900 lbm (409 kg) to achieve 100 mpg (per EPA curve), and secondly, the poor acceleration rates of hybrids imply that fuel economy improvement has largely come at the expense of acceleration. Had the hybrids been required to provide an acceleration rate capability of a more acceptable value, i.e., 0.34 g (~8 second 0-to-60 mph time), the hybrid's fuel economy would have fallen in close proximity to the EPA's line, which is representative of non-hybrid vehicles. A reduction in hybrid vehicle weight (including removing the added hybrid components) may have provided a more attractive solution in acceleration and fuel economy. Data displayed for the non-Hybrid version of the Honda Civic confirms this—30 mpg with an 8 second 0-60 mph time. The challenge is thus to provide a solution which provides a safe and marketable level of acceleration while achieving super-efficiency. The performance of the present invention, data point labeled "ES1", supports these requirements, as per the following invention prescription.

Figure 9:
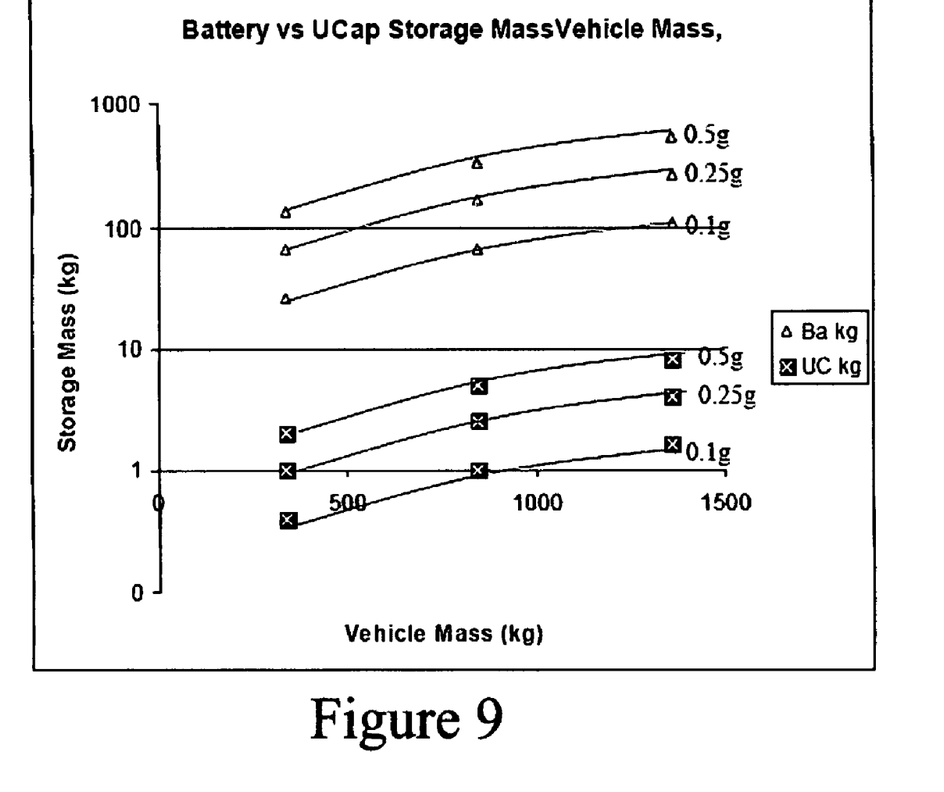
FIG. 9 relates the mass of storage required by battery and ultracapacitor storage solutions (based upon acceleration power), per vehicle mass and acceleration rate, for battery and ultracapacitor solutions.
Figure 10:
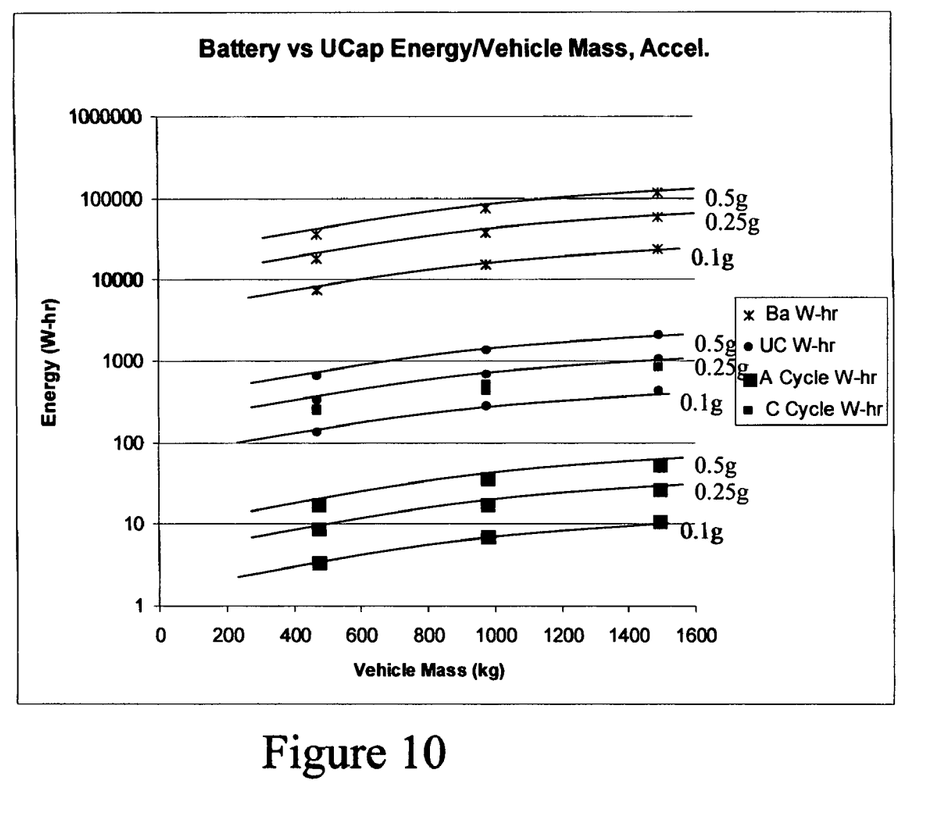
FIG. 10 displays the resulting stored energy as driven by the acceleration power requirements, and the acceleration cycle and combined "city cycle" energy, for battery and ultracapacitor solutions.

In applying the presented power equation to city driving conditions (accelerating, constant velocity, constant velocity with grade climbing, constant velocity descending grade, braking and idling), maximum power rates are shown to be driven by the accelerating condition. FIG. 9 compares the mass of an advanced battery (100 W/kg per U.S. DOE 2005 data) vs. a commercially-available UC (6600 W/kg) required for a given vehicle mass and desired acceleration. Required storage mass is seen therein to increase with increasing vehicle mass and desired acceleration rates, with battery mass exceeding a UC solution by a full-order of magnitude for a given condition. The energy wasted in the moving of battery mass is significant. From FIG. 9, an acceleration capability of 0.3 g, results in the carrying of 100 kg of battery mass for a 338 kg mass vehicle, or roughly a third of the vehicle weight. This mass of battery would consume 600 W of energy when in steady-state motion at 35 miles-per-hour, negating opportunity to achieve superior fuel efficiency (note that higher vehicle weights render poorer results). Comparatively, a UC-based solution for the same parameters would weigh just 1.5 kg and consume 9 W of constant carrying power at 35 miles-per-hour.

Figure 3:
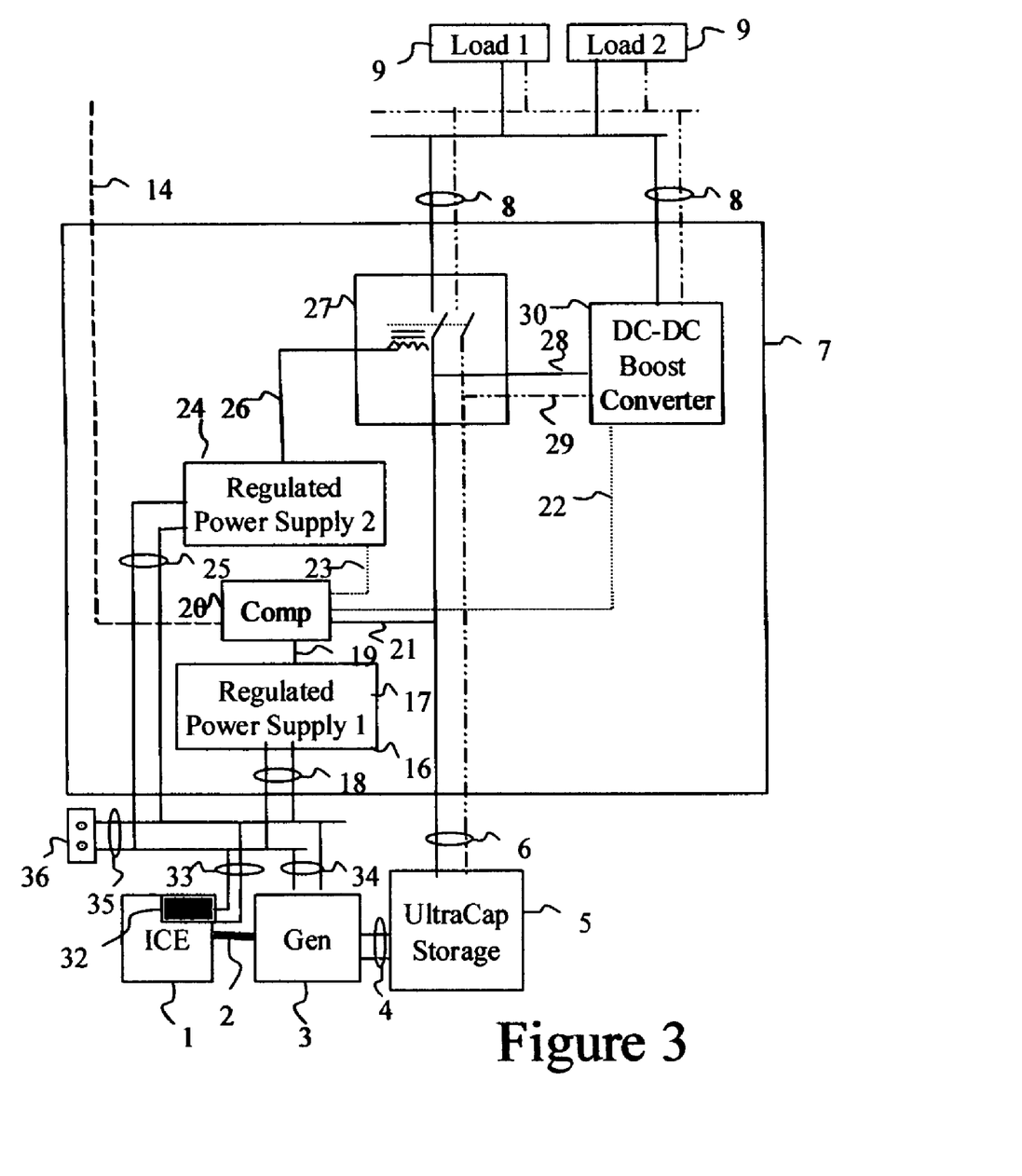
FIG. 3 further describes the components and configuration of the energy storage and control system.
Figure 4:
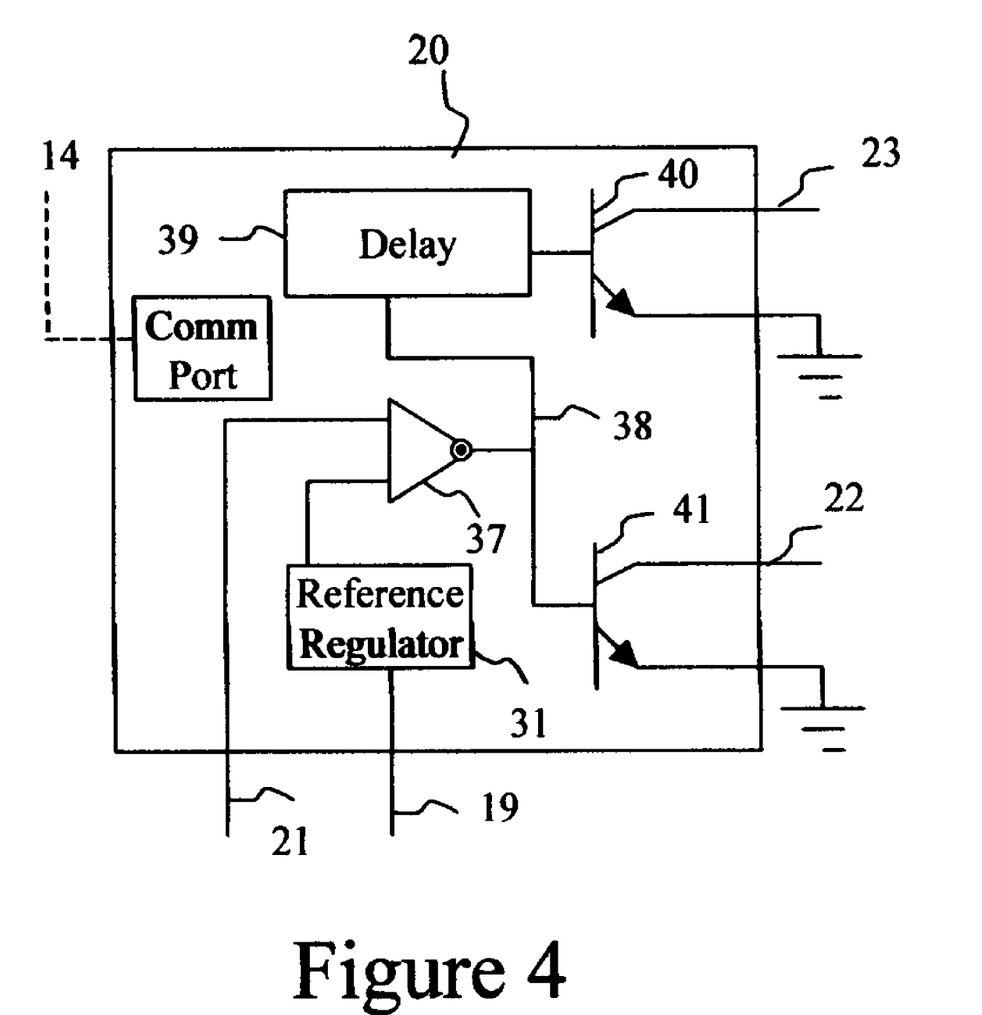
FIG. 4 further describes the comparator circuit within the energy control system.

While power-driven UC storage mass requirements display a distinct advantage, the lower energy storage requirements place an additional constraint, which leads to the unique solution of the present invention. In FIG. 4 the required energy (W-hr) for the aforementioned city cycle (labeled by "C Cycle W-hr, consisting of 403 seconds, covering 5834 m) is plotted coincidentally with the energy provided by the power-driven design points of FIG. 3. For UCs, the energy requirements for an entire city cycle are seen therein to exceed the energy that would be provided if the design had considered power alone. Whereas the exceedingly higher mass and energy of the battery solutions driven by power requirements provide 30-150 city cycles of energy storage, the UC solutions can result in less than a single city cycle of energy storage. As the optimum (carrying least mass of storage) is approached, variable driving conditions require accommodation (such as a long grade followed by acceleration). This can be addressed by higher storage amounts, or by application of direct ICE shaft power (parallel hybrids) when storage is depleted. The latter requires an ICE capable of full power requirements, thus incurring added weight and associated carrying cost (fuel economy reduction).

Determination of energy storage requirements accounting for variable driving cycles brings forth further insight into the novelty of the present invention. For battery-based ESS systems, limited charge and discharge rate characteristics forced excessive amounts of energy storage, hence high mass of storage. In parallel hybrids this was dealt with by high mass storage or larger and heavier ICEs and motors. The ability of UCs to receive and discharge power at rates 2 orders of magnitude higher than batteries enables a hybrid drivetrain to carry much less energy, and therefore much less mass.

Increased cycle lifetime of the energy storage medium becomes a further requirement that arises when designing for lower mass storage. Batteries typically exhibit 500 cycles until deteriorating to an 80% maximum recharge capacity level, whereas UCs display 0.5M-1.0M cycles to this level. Designing for the small cycle life of batteries also results in extensive mass storage and associated carrying inefficiency.

Figure 1:
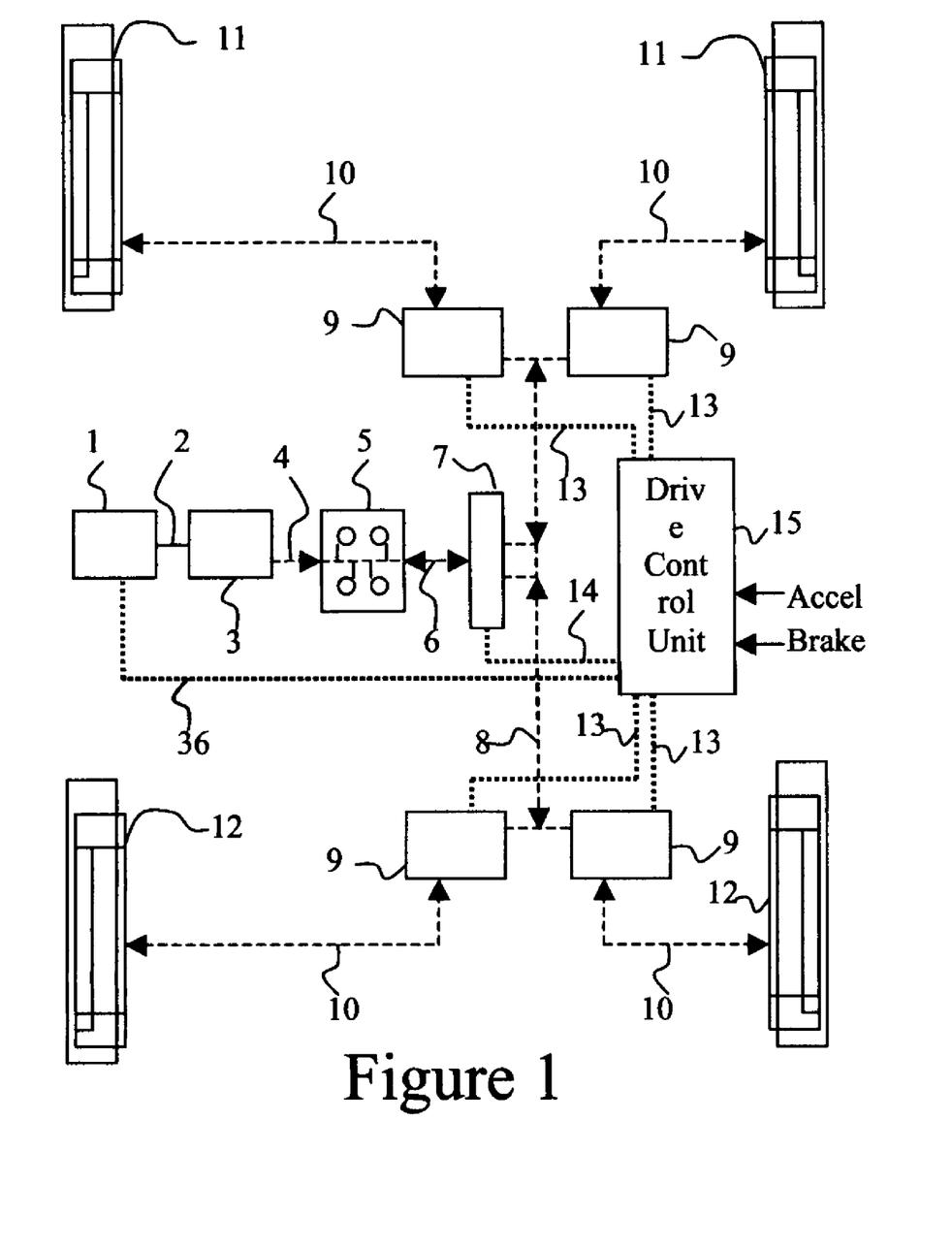
FIG. 1 describes the hybrid drivetrain components and connections.

The present invention embodies a serial hybrid drivetrain for a lightweight vehicle consisting of an ICE and directly-coupled generator serving power to electric motors that provide rotational power to the vehicle's wheels, and said generator alternately or in parallel providing power to restore energy to the ESS, with said ESS system configured to provide power directly to the said electric motors, with said ESS having a single energy storage medium of high power density (>1000 Wkg), and having a high cycle life (>500,000 cycles to a deteriorated state of 80% capacity recharge level), and accepting charge rates of the maximum of charge rates from the ICE/generator and/or regenerative braking from the electric motors, and the sizing and charge/discharge efficiency of said ESS system such that excess storage and corresponding wasted "carrying" energy is minimized, and said serial hybrid drivetrain operated by a compatible control system which operates the engine at its peak efficiency point (FIG. 1). Under the stated constraints of low vehicle mass, high power density and minimized energy storage, higher vehicle fuel efficiency is obtained, with a resulting shorter duration, higher-frequency of on and off cycling (herein labeled "short cycling") of the ICE and depletion/replenishment of the ESS than is obtained with current low density storage mediums (batteries for example) and their combinations with high density mediums. Future storage mediums which exhibit the qualities now only attributable to UCs would be amenable to this prescribed invention.

Figure 5:
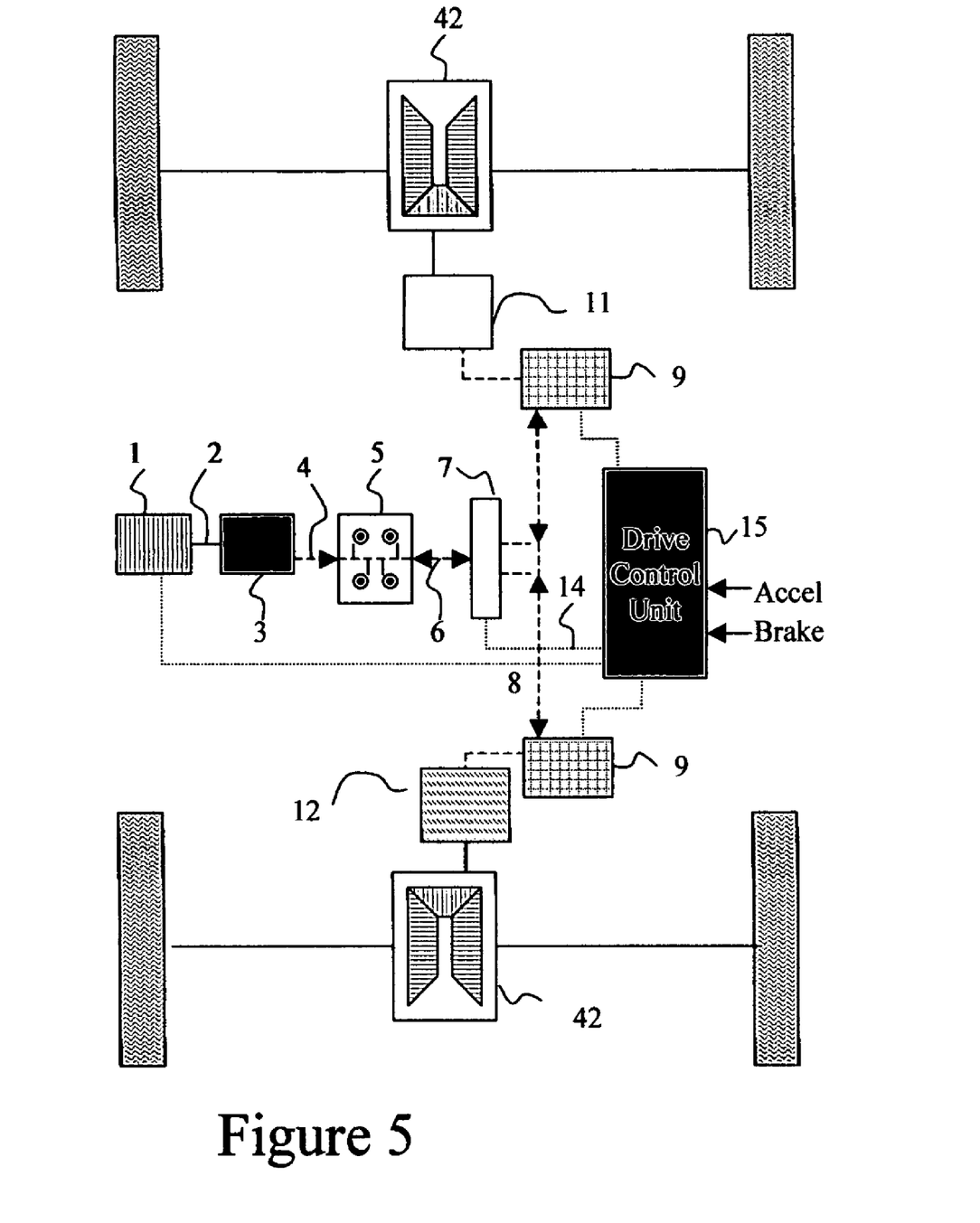
FIG. 5 illustrates a variant of the invention, utilizing alternative motors 10, 11 to achieve different speed/torque capabilities in a 4 wheel drivetrain (without a transmission or mechanical coupling mechanism).
Figure 6:
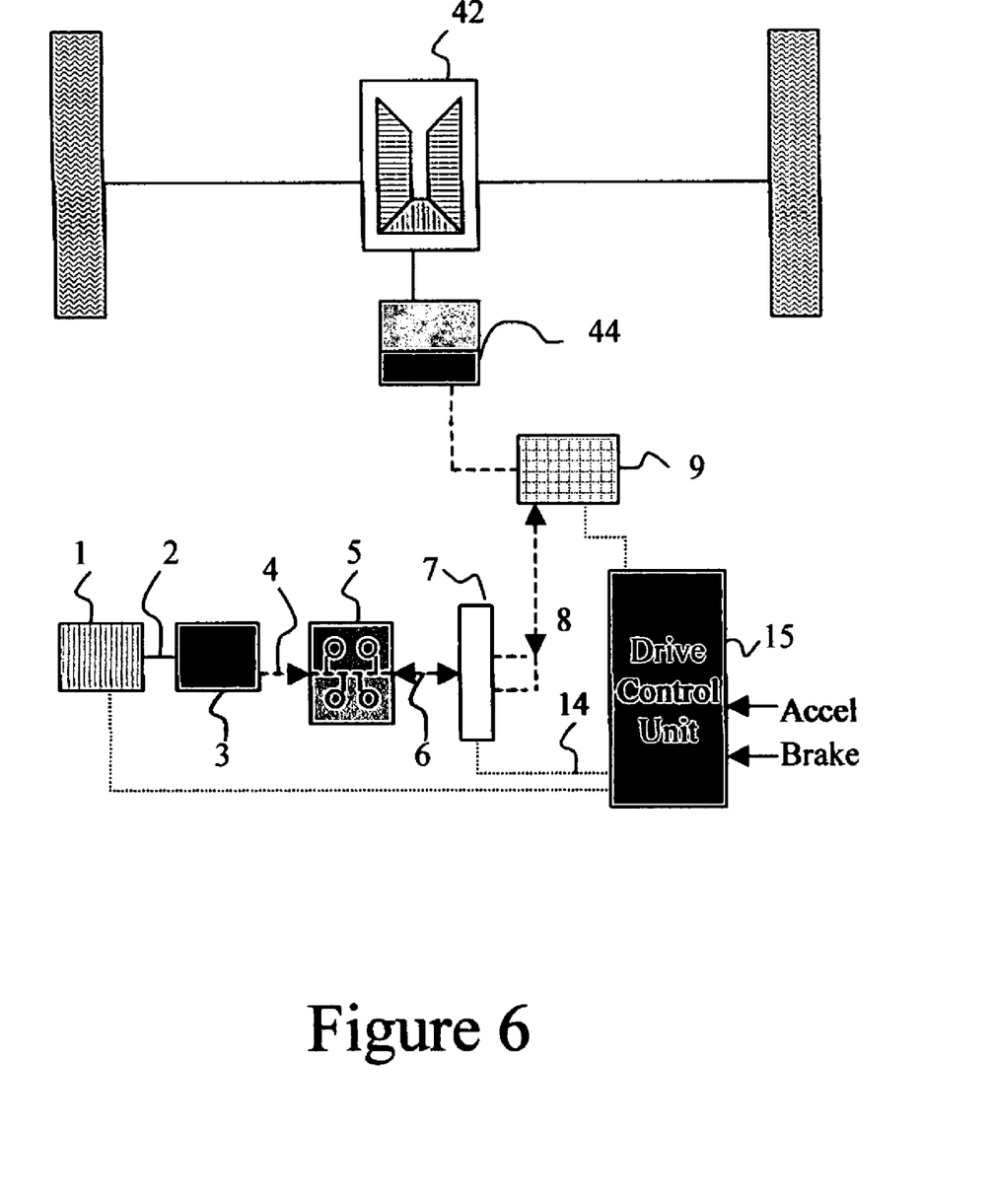
FIG. 6 illustrates a variant of the invention, utilizing a dual-winding within a single motor 44 to achieve different speed/torque capabilities in a 2 wheel drivetrain (without a transmission or mechanical coupling mechanism).

In the preferred embodiment of the present invention high efficiency (>95% efficiency units are currently available) brushless DC motors (also be referred to as AC synchronous motors driven at variable frequency via DC-AC motor controller) drive the wheels. As displayed in FIG. 1, the motors may be located in the wheel housing (called a wheel-motor) thus eliminating mechanical drive shaft and differential components. Operated via motor controller having "4-quadrant" control, the brushless DC motors and controllers permit the capture of regenerative braking energy to flow back to the ESS. Alternate motor and mechanical drive configurations are displayed in FIGS. 5, 6, and 7. While incurring additional cost, the driving of all vehicle wheels with motors enables higher capture of regenerative braking energy.

Figure 2:
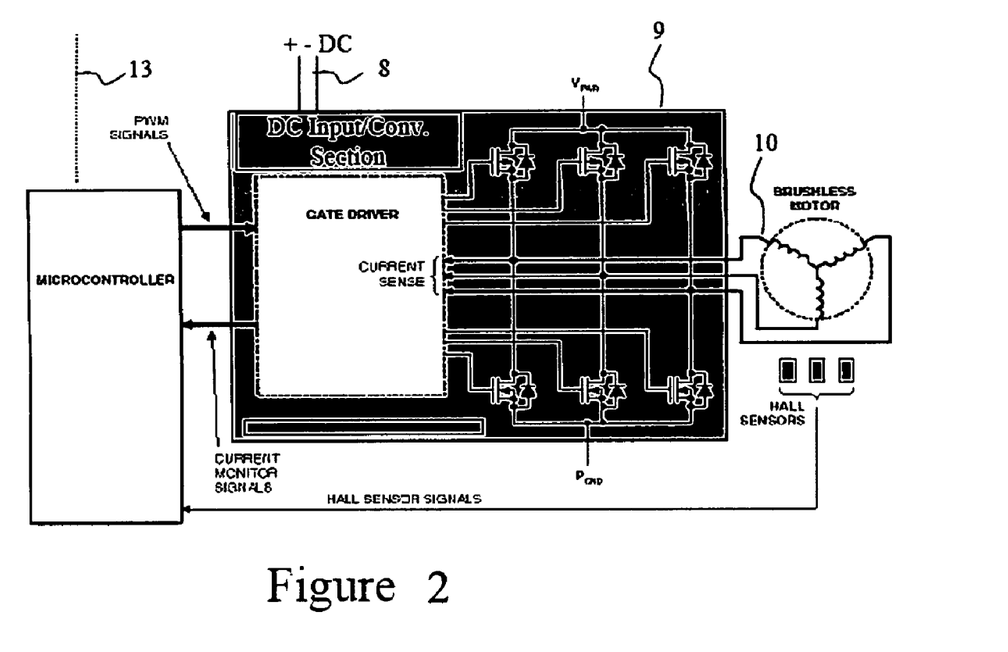
FIG. 2 illustrates an example motor controller (brushless DC illustrated).

In the preferred embodiment of the present invention (reference FIG. 1), an ICE 1 drives a high efficiency generator 3 via a shaft 2 which delivers DC power to the UC storage 5 via electrical connections 4. Sequencing (on/off, durations) of the ICE 1 is controlled by the drive control system 15 via connection 36. The ESS control system 7 controls power flow between the UCS 5 via connection 6 and the loads (4 quadrant brushless DC motor controllers 9) via connection 8. A micro controller within the brushless DC motor controller creates PWM (pulse width modulated) signals to gate drivers which in turn pulse high current transistors that in turn provide the multi-phased, pulsed power to the DC brushless motors 11 and 12 via connection 10 (FIG. 2). Control of the brushless DC motor controllers is provided via connection 14 to the Drive Control Unit 15. Under braking signal from the vehicle driver, the drive frequency is decreased below that of the rotating motors 11, inducing reverse current flow which is then converted back to DC power and fed onto the UCS 5. Starting of the ICE 1 is accomplished by an electric starter motor 32. A 12VDC battery 36 has as its sole function to provide power to the starter motor 32, and control circuits within the ESS control system 7 and Drive Control Unit 15. The battery 32 capacity is maintained by a separately regulated output from the generator 3 via connection lines 34.

The Comparator Circuit 20 monitors the high voltage side of the bus via connector 21. When the feed bus high voltage falls beneath a threshold value the Comparator 20 releases the inhibit signal line 22 inducing the onstate of the DC-DC Boost Converter 30. Bus Connections 28, 29 supply power to the DC-DC Converter 30 which is connected to common terminals of the Contactor 27. Contactor 27 is in a normally-closed condition when the UCS bus 6 voltage is above the low-voltage threshold previously described. Under low voltage conditions, Comparator 20 releases an inhibit release signal via connection line 23 to a regulated supply 24 which energizes the coil of Contactor 27, thus directing all power flow from the UCS 5 to the DC-DC Converter 30 for up-conversion to the requisite output voltage required by the load. Connection lines 8 (from the Contactor 27) direct power to the common load bus under the NC state of Contactor 27, whereas power is directed via connection lines 8 from the DC-DC Converter output under the case of low UCS bus voltage. A delay corresponding to the known response time of the DC-DC converter ensures that opening of Contactor 27 connection to the output bus lines 6 does not cause momentary sagging of the ESS output voltage (alternative control designs may equivalently serve to ensure smooth operation of the ESS output bus during switching). A Regulated Power Supply 17 is connected to the battery bus via connection lines 18, to provide controlled, logic level power supply to the Comparator 20. Regulated Power Supply 24 provides a controlled DC level to operate the coil in Contactor 27, also supplied by the battery 36.

FIG. 4 displays the Comparator Circuit 20 wherein connection line 19 receives regulated power from Regulated Power Supply 17, delivering controlled logic-level voltage as reference input to the low-side of the Comparator 37 via the Reference Regulator 31. Connection line 21 provides the voltage sense input to the Comparator 37 from UCS bus 6. When the difference between the Comparator 37 inputs falls beneath the threshold value, connection line 38 energizes Power Transistor 41 sending the inhibit release signal to the DC-DC Converter 30 via connection line 22. Connection line 38 also activates the Delay 39 which activates Power Transistor 40 (after its prescribed delay, or similar control function) which, via connection line 23 enables Regulated Power Supply 24, which then powers the coil in the Contactor 27 via connection line 26.

Figure 7:
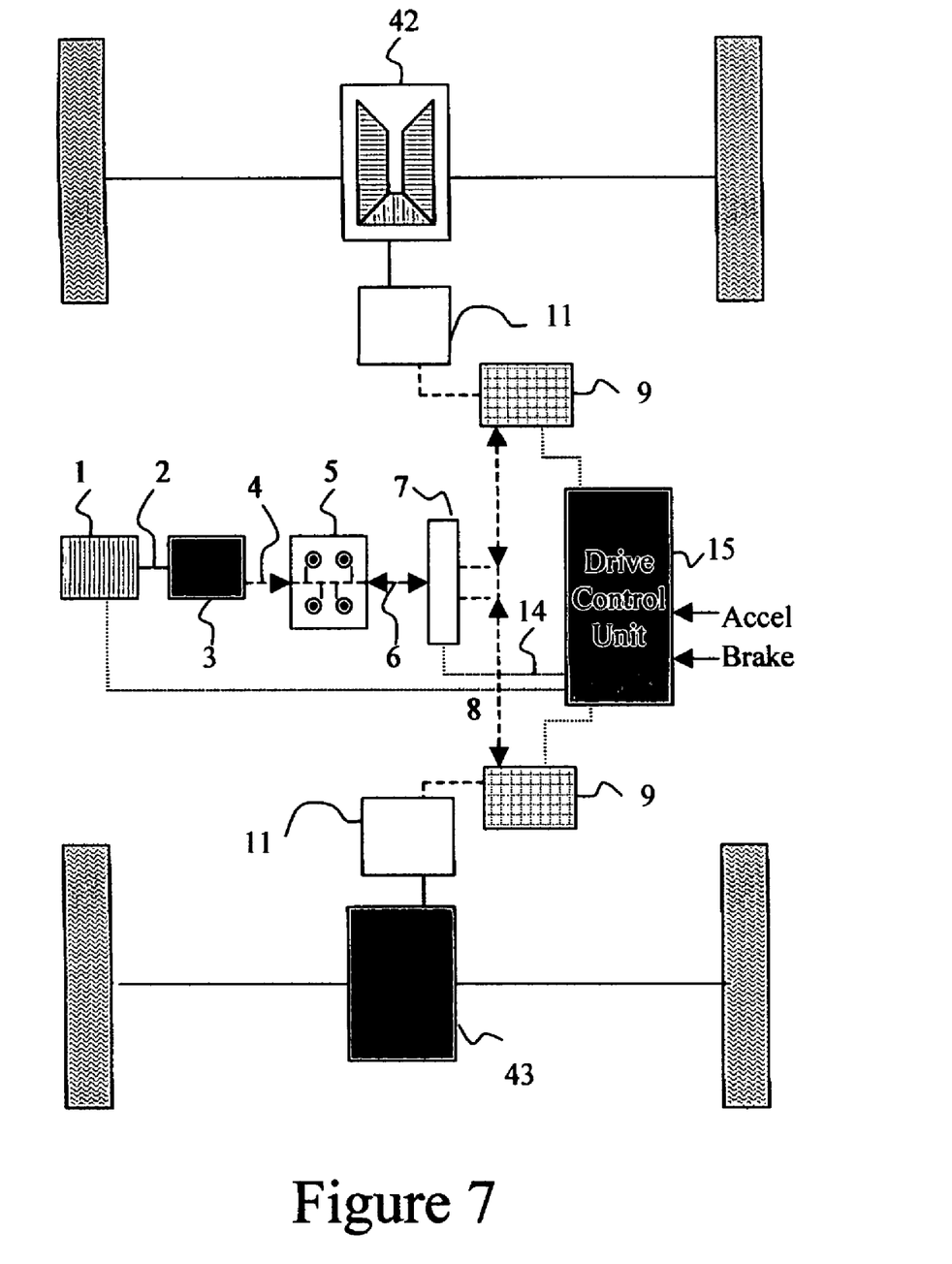
FIG. 7 illustrates a variant of the invention, utilizing differentials 42, 43 with different, yet fixed gear ratios to achieve different speed/torque capabilities in a 4 wheel drivetrain (without a transmission or mechanical coupling mechanism).

Securing the advantage of mechanical transmission and decoupling mechanism elimination requires attention to high starting torque and maximum motor speed requirements. In addition to the configuration of FIG. 1 (wheel-motors of differing torque/speed characteristic, front/rear), configurations using differently wound motors (one wound for high-torque, one for high-speed-FIG. 5), use of dual-windings within the same motor (one winding for high-torque, one for high-speed-FIG. 6), and use of differentials having different gear ratios (FIG. 7). Alternative combinations are obvious to the observer, including 2 and 4 wheel drive options.

A serial hybrid drivetrain represents one application benefiting from the prescribed apparatus, and serves to illustrate component types, requirements and advantages and feasibility of the apparatus. In this case, there exist varying, and high current demands to and from the motor-generators which drive the vehicle wheels. In one example where system weight and efficiency are of high priority, a lightweight and high charge/discharge rate, and high efficiency of energy transfer, the prescribed UCS-based ESS apparatus is particular advantage. An example system design has a DC generator as its DC Source 1. In an example case of a 48V system bus, a single Maxwell BMOD00165-E048 UltraCapacitor provides 50 Watt-hr of capacity, a discharge rate maximum of 93 kW and maximum short circuit current of 4800 Amps. A Curtis Albright SW1000A DC contactor affords 1000 A expected maximum application requirements, and consumes 30 W of coil power when activated. American Power Design's H30 DC-DC converter supplies the Contactor coil power over the wide range of input voltage. A Dallas Semiconductor Max5090A affords regulated 3.3V power to the National Semiconductor LM139 comparator over an input voltage range of 6.5 to 76V. A Logic-level, 5V signal from LM139 drives power transistor VN02NSP by STMicroelectronics, enabling the DC-DC converter 24 and the delay 26. A typical 48V brushless DC motor having 95% efficiency and a controller of similar efficiency exhibits a functional input range of 40 to 50 VDC and exhibits combined efficiency of 90%. When applied to single unit of the described UC, the UC output would be below the useable range of the motor controller in 1 second, when drawing at a 500 amp rate. Utilizing the prescribed apparatus of this invention and using available high-efficiency DC-DC converter technology having a 2:1 input range from 20-40 Volts, 500 amps could be then drawn for 5 additional seconds, an increase of 500%. The use of the upconversion device in only the lower voltage or state-of-charge condition averts the upconversion loss when not required. When such a system is in regenerative mode, the vehicle application controller signals the Comparator Circuit, closing the Contactor enabling reverse energy flow to the UCS. This all-UC based design permits full-rate regenerative braking energy flow from the wheel motor-generators, where other designs either waste the excess energy in heat, or require additional storage. In operational cases where the UCS is currently at a full SOC, additional UCS storage would also be required when regenerative braking energy becomes available, however, this is accommodated in design with a larger UCS system in the prescribed apparatus, and is more efficient in energy transfer and weight than a combined battery system, translating to higher vehicle efficiency.

Herein, the invention has been described with reference to specific embodiments, however, modifications and variations of the invention may be constructed without departing from the scope of the invention as it is defined in the following claims.

What is claimed is:

1. A system for providing power to drive a vehicle, comprising:
   an internal combustion engine;
   a generator coupled to the internal combustion engine;
   an energy storage and management system connected to the generator, the energy storage and management system comprising (i) a comparative circuit for monitoring a primary voltage from a power source to a load, (ii) a DC-DC boost converter connected to the load, and (iii) a contactor switch in series between the power source and the load, the switch configured to select either a direct connection from the power source to the load or a connection from the power source through a DC-DC boost converter to the load, the switch selection based on a first voltage threshold level;
   wherein the generator is configured to (i) provide power to the load from the internal combustion engine when the power source is below a second threshold level and to (ii) recharge the power source.

2. The system of claim 1 wherein the power source is an ultra-capacitor.

3. The system of claim 1 wherein the load comprises an electric motor that provides rotational power to drive a wheel.

4. The system of claim 3 wherein the electric motor is a DC brushless motor and further comprising a DC motor controller in electrical communication with the DC motor.

5. The system of claim 1 wherein the load comprises a DC electric motor that provides rotational power to drive a wheel and further comprising a braking system wherein the braking system is configured to induce a reverse current flow when the wheel speed is decreased below the speed of the DC electric motor.

6. The system of claim 5 further comprising a motor controller configured to transfer braking power using the reverse current flow to the energy storage system.

7. The system of claim 1 further comprising a drive control unit operative to control the internal combustion engine.

8. The system of claim 7 further wherein the load comprises a DC electric motor that provides rotational power to drive a wheel and a DC motor controller in electrical communication with the DC electric motor.

9. The system of claim 8 further comprising a braking system wherein the braking system is configured to induce a reverse current flow when the wheel speed is decreased below the speed of the DC electric motor.

10. The system of claim 9 further comprising a motor controller configured to transfer braking power using the reverse current flow to the energy storage system.

11. The system of claim 7 wherein the drive controller controls the sequencing of the engine at its peak efficiency point.

* * * * *